(12) United States Patent
Ho et al.

(10) Patent No.: US 9,896,562 B2
(45) Date of Patent: Feb. 20, 2018

(54) NETWORKS AND METHOD FOR PRODUCING THE SAME

(71) Applicant: National Tsing Hua University, Hsinchu (TW)

(72) Inventors: Rong-Ming Ho, Hsinchu (TW);
Han-Yu Hsueh, Hsinchu (TW);
Yu-Chueh Hung, Hsinchu (TW);
Yi-Chun Ling, Hsinchu (TW);
Hsiao-Fang Wang, Hsinchu (TW);
Lung-Yu Chang Chien, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 93 days.

(21) Appl. No.: 15/218,290

(22) Filed: Jul. 25, 2016

(65) Prior Publication Data

US 2016/0333163 A1 Nov. 17, 2016

Related U.S. Application Data

(62) Division of application No. 14/287,352, filed on May 27, 2014, now Pat. No. 9,428,626.

(30) Foreign Application Priority Data

May 12, 2014 (TW) .............................. 103116721 A

(51) Int. Cl.
*C08J 9/26* (2006.01)

(52) U.S. Cl.
CPC ........... *C08J 9/26* (2013.01); *C08J 2201/046* (2013.01); *C08J 2205/04* (2013.01); *C08J 2300/00* (2013.01); *C08J 2353/00* (2013.01); *Y10T 428/249921* (2015.04)

(58) Field of Classification Search
CPC .............................. C08J 9/26; C08J 2201/046
See application file for complete search history.

(56) References Cited

U.S. PATENT DOCUMENTS

| | | |
|---|---|---|
| 2011/0104401 A1 | 5/2011 | Ho et al. |
| 2013/0180920 A1 | 7/2013 | Sivaniah et al. |

OTHER PUBLICATIONS

Vignolini, Silvia et al. "A 3D Optical Metamaterial Made by Self-Assembly." *Advance Materials* vol. 24, 2012 OP23-OP27.
Epps III, Thomas H. et al. "Ordered Network Phases in Linear Poly(isoprene-b-styrene-b-ethylene oxide) Triblock Copolymers." *Macromolecules* 2004, vol. 37, pp. 8325-8341.
Saranathan, Vinodkumar et al. "Structure, Function and Self-Assembly of Single Network Gyroid (I4,32) Photonic Crystals in Butterfly Wing Scales." PNAS Jun. 29, 2010, vol. 107, No. 26 pp. 11676-11681.
Hsueh, Han-Yu et al. "Shifting Networks to Achieve Subgroup Symmetry Properties." Mar. 27, 2014. *Adv. Mater.* 2014 Pates 1-20.

*Primary Examiner* — James Sanders
(74) *Attorney, Agent, or Firm* — Huffman Law Group, PC

(57) ABSTRACT

An embodiment of this invention discloses a method for producing a network texture and the method comprises the steps of: formation of a porous structure as a template (matrix); formation of two coherent, independent, and separated robust continuous network structures within the matrix by using the matrix as the template; softening or removing the matrix to shift the two continuous network structures, leading to a novel network texture comprising two incoherent continuous network structures.

4 Claims, 8 Drawing Sheets

NETWORKS AND METHOD FOR PRODUCING THE SAME

CROSS-REFERENCE TO RELATED APPLICATIONS

This application is a divisional application of application Ser. No. 14/287,352, filed May 27, 2014 and entitled "NETWORKS AND METHOD FOR PRODUCING THE SAME," which claims priority to Taiwan Patent Application No. 103116721, filed on May 12, 2014, the entire contents both of which are incorporated herein by reference.

BACKGROUND OF THE INVENTION

1. Field of the Invention

The present invention relates to network textures and their producing methods.

2. Description of Related Art

Soft matter such as block copolymers (BCPs), surfactant-water systems, and liquid crystals can form regular structures on the micron to nanometer scales. Much attention has been paid to complex three-dimensional (3D) interconnected network structures as they are self-supported and have high specific surface and high porosity.

In particular, three bi-continuous cubic phases formed by two continuous interpenetrating networks, including double gyroid (DG, Ia$\bar{3}$d), double diamond (DD, Pn$\bar{3}$m), and plumber's nightmare structure (double P (DP), Im$\bar{3}$m), have drawn much interest due to their complex and periodically regular configuration. The continuous nature of nanoscale textures combined with their unique structural and physical properties has sparked immense interest for applications such as catalysis, separation, nanoreactor and optoelectronic devices. Moreover, because of the two chiral networks, the double gyroid (DG) structure has attracted much interest.

The basic shape of the gyroid is a three-fold junction of three arms, in which each arm connects to another planar set of three arms that are each themselves rotated and connected to form a three-dimensional (3D) network. The double gyroid (DG) structure is composed of a cubic matrix and a pair of continuous, interpenetrating but independent, coherent single gyroid (SG, I4$_1$32) networks, one left- and one right-handed, to form an achiral structure in 3D space. By contrast, the single gyroid (SG) structure is a chiral structure with only one continuous network; the network can be left or right-handed. However, single gyroid (SG) is rare, and can only be found in some specific systems such as the butterfly wings from Papilionidae and Lycaenidae families (V. Saranathan, C. O. Osuji, S. G. J. Mochrie, H Noh, S. Narayanan, A. Sandy, E. R. Dufresne, R. O. Prum, Proc. Natl. Acad. Sci., U.S.A. 2010, 107, 11676) and triblock terpolymers (T H Epps, E W Cochran, T S Bailey, R S Waletzko, C M Hardy, F S Bates, Macromolecules 2004, 37, 8325-8341; S Vignolini, N A Yufa, P S Cunha, S Guldin, I Rushkin, M Stefik, K Hur, U Wiesner, J J Baumberg, U Steiner, Adv. Mater. Adv. Mate. 2012, 24(10), OP23-OP27). The butterflies develop the thermodynamically favored double gyroid (DG) precursors, in which one of the two single gyroid structures is decomposed to form a single gyroid (SG) structure with significant optical efficiency. This three dimensional (3D) periodicity potentially manipulates light in all directions, giving bright reflected color over a broad angle. Note that single gyroid (SG, I4$_1$32, No. 214) is the subgroup of the super group double gyroid (DG, Ia$\bar{3}$d, No. 230); namely, the symmetry of single gyroid (SG) is lower than that of double gyroid (DG). To obtain a single gyroid (SG) structure via artificial manufacturing requires great effort.

SUMMARY OF THE INVENTION

In one general aspect, the present invention relates to network textures and their producing method.

According to an embodiment of this invention, a method is provided with the steps of: forming a porous structure as a matrix; forming two coherent, independent, and separated robust continuous network structures within the matrix by using the matrix as the template; and softening or removing the matrix to shift the two continuous network structures, leading to a novel network texture comprising two incoherent continuous network structures.

According to another embodiment of this invention, a network texture is provided with two incoherent continuous network structures.

Preferably, the network texture is made by the above-mentioned method.

DETAILED DESCRIPTION OF THE PREFERRED EMBODIMENT

Figure 1A:
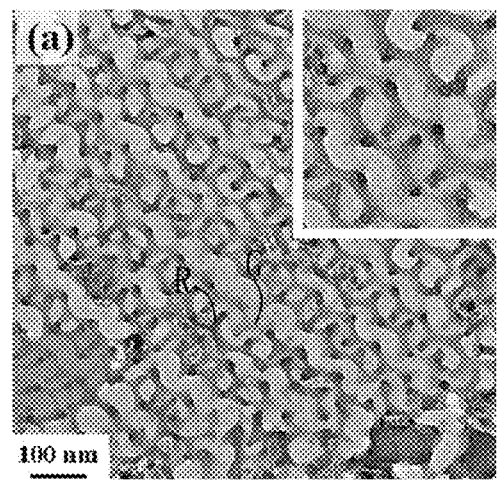
FIGS. 1A and 1B are transmission electron microscopy (TEM) images of the <211> projection of fabricated PS/SiO$_2$ double gyroid (DG) nanohybrids in accordance with an embodiment of the present invention and are taken before and after the thermal treatment, respectively.

Reference will now be made in detail to those specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known process operations and components are not described in detail in order not to unnecessarily obscure the present invention. While drawings are illustrated in detail, it is appreciated that the quantity of the disclosed components may be greater or less than that disclosed, except where expressly restricting the amount of the components. Wherever possible, the same or similar reference numbers are used in drawings and the description to refer to the same or like parts.

Varied continuous networks and their properties have been developed and studied by scientists, and it is difficult and interesting to find novel three-dimensional structures. The inventors of the present invention discover novel network textures and their producing method.

In an embodiment, a network texture is provided with two incoherent (or subgroup symmetry) continuous network structures.

In an embodiment, the network texture is made by a method comprising the steps of: (1) forming a porous structure as a matrix; (2) forming two coherent, independent, and separated robust continuous network structures within the matrix by using the matrix as a template; and (3) softening or removing the matrix to shift the two continuous network structures, leading to a novel network texture comprising the two incoherent continuous network structures.

Preferably, the novel network texture is a polygrain configuration, and the displacements between two continuous network structures have various directions and magnitudes in a given grain.

In an embodiment, when a small-angle X-ray scattering (SAXS) analysis is performed to the two incoherent continuous network structures, only one of the two incoherent continuous network structures is identified by the small-angle X-ray scattering analysis.

In an embodiment, the two continuous network structures are made of a same material. In another embodiment, the two continuous network structures are made of two different materials. For example, the two continuous network structures can be made of organic materials (polymer, liquid crystal, organic polymers, etc.) or inorganic material (ceramic material, metal, etc.).

In an embodiment, the matrix is removed by thermal treatment, solvent, photo-decomposition, ozonolysis, and/or calcination.

In an embodiment, the two coherent continuous network structures are two single gyroid network structures (construct a double gyroid), and transform to two incoherent single gyroid network structures after the network shifting.

In an embodiment, the two coherent continuous network structures are two single diamond network structures (construct a double diamond), and transform to two incoherent single diamond network structures after the network shifting.

In an embodiment, the two coherent continuous network structures construct a plumber's nightmare structure (double P (DP), Im3̄m), and transform to a single plumber-like structures after the network shifting.

Without limiting the scope of the present invention, an embodiment of the present invention illustrates a novel network texture and its fabrication method as follows.

Firstly, a block copolymer with porous structure is formed and is used as a matrix. Then the block copolymer matrix is used a template, and a material fills the porous structure of the matrix, so as to form a double gyroid (DG) within the matrix. The matrix is then softened to shift two single gyroids of the double gyroid and hence form a novel network texture. The following describes more detail.

A polystyrene (PS) and poly-L-lactide (PLLA) block copolymer (PS-PLLA BCP) is prepared by a double-headed polymerization sequence. The molecular weight of polystyrene ($M_{n,PS}$) and poly-L-lactide ($M_{n,PLLA}$) are 34000 g mol$_{-1}$ and 27000 g mol$^{-1}$, respectively. The polydispersity index (PDI) of the block copolymer is 1.21 and the volume ratio of poly-L-lactide ($f_{PLLA}^v$) is 0.39. A PS-PLLA film is solution cast from dichloromethane ($CH_2Cl_2$) solution (10 wt % of PS-PLLA) at room temperature and then dried in a vacuum.

To eliminate the undesirable disturbance of poly-L-lactide (PLLA) crystallization on the shape of the domains during microphase separation, the as-cast samples are annealed at temperature above the melting temperature of poly-L-lactide (PLLA) but below its order-disorder transition temperature. For example, the annealing temperature is about 185° C. The produced PS-PLLA film is then rapidly cooled below the glass temperatures of polystyrene (PS) and poly-L-lactide (PLLA), yielding the micro-phase-separated double gyroid (DG) domain structure as expected from the phase diagram of PS-PLLA. The one-dimensional small-angle X-ray scattering (1D SAXS) profile shows characteristic reflections from the Ia3̄d double gyroid (DG) phase. Note that characteristic reflections for a DG-forming block copolymer occur at the relative q values of $\sqrt{6}$ and $\sqrt{8}$. After that, the poly-L-lactide (PLLA) blocks of the PS-PLLA block copolymer are removed by hydrolysis using a 0.5 M base solution. By hydrolytic treatment, the poly-L-lactide (PLLA) networks are selectively removed to give a nanoporous polystyrene (PS) matrix possessing two interconnected air networks. The set of reflections from the PS/air structure can be indexed as 211 (q=$\sqrt{6}$), 220 ($\sqrt{8}$), 321 ($\sqrt{14}$), 400 ($\sqrt{16}$), 521 ($\sqrt{30}$), 543 ($\sqrt{50}$). The $d_{211}$ as determined by the primary peak is approximately 39.8 nm. Images of the DG-forming PS-PLLA and the nanoporous PS template with ordered nanopores can be observed by transmission electron microscopy (TEM) and Field-Emission Scanning Electron Microscope (FESEM), respectively.

After that, precursors of $SiO_2$ are infiltrated into the nanoporous polystyrene (PS) template with precursors and a sol-gel reaction is conducted to obtain $PS/SiO_2$ nanohybrids. The one-dimensional small-angle X-ray scattering (SAXS) profile of the $PS/SiO_2$ nanohybrids with the diffraction peaks at the relative q values of $\sqrt{6}:\sqrt{8}$ suggests the formation of a well-ordered $PS/SiO_2$ double gyroid (DG) nanohybrid structure. The $d_{211}$ as determined by the primary peak is reduced to approximately 36 nm from 40 nm, most likely because of the swelling of the polystyrene (PS) matrix by methanol, resulting in a reduction in the dimension of the double gyroid (DG) during the aging period for the formation of $SiO_2$ microdomains.

FIG. 1A is a transmission electron microscopy (TEM) image showing a <211> projection of the $PS/SiO_2$ DG nanohybrids with a "double wave" pattern being identified, confirming the double gyroid (DG) structure. Further, the $d_{211}$ of the $PS/SiO_2$ DG nanohybrids is measured as ~36 nm, which is in good agreement with the small-angle X-ray scattering (SAXS) results.

Next, the fabricated $PS/SiO_2$ double gyroid (DG) nanohybrids are further heated at a rate of 1° C./min to 180° C. To trace the morphological evolution and to find any corresponding phase transition behavior, temperature-resolved small-angle X-ray scattering (SAXS) experiments from 30° C. to 180° C. are carried out, as shown in FIG. 1D. A new reflection at the low q region can be found once the temperature reaches approximately 140° C., well above the glass transition temperature (Tg) of the polystyrene (PS) matrix. The new reflection is at the relative q value of $\sqrt{2}$ as compared to the second reflection at $\sqrt{6}$. Also, a significant increase in the scattering intensity of the small-angle X-ray scattering (SAXS) profile can be found. On the basis of the scattering results, the thermal treatment results in a phase transformation to a new structure with the reflections at the relative q values of $\sqrt{2}:\sqrt{6}:\sqrt{8}:\sqrt{14}:\sqrt{30}$ marked by dotted arrows, as shown in FIG. 1E.

Figure 1B:
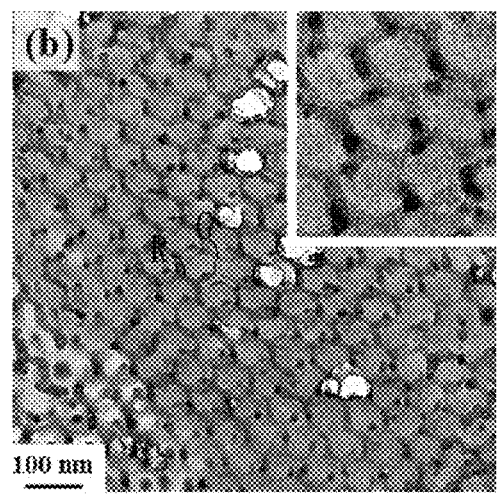

FIGS. 1A and 1B are transmission electron microscopy (TEM) observations of the <211> projection of fabricated $PS/SiO_2$ double gyroid (DG) nanohybrids before and after the thermal treatment, respectively.

Figure 1C:
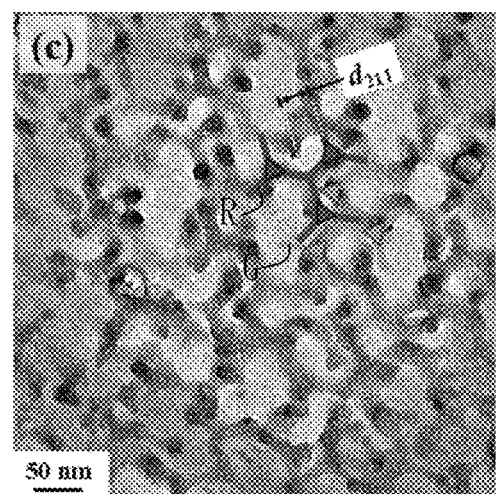
FIG. 1C is the corresponding transmission electron microscopy (TEM) micrograph of the <111> projection of FIG. 1B, wherein red (R) and green (G) triangular elements indicate a pair of interpenetrating but independent SG networks that have shifted relative to the DG structure.
Figure 1D:
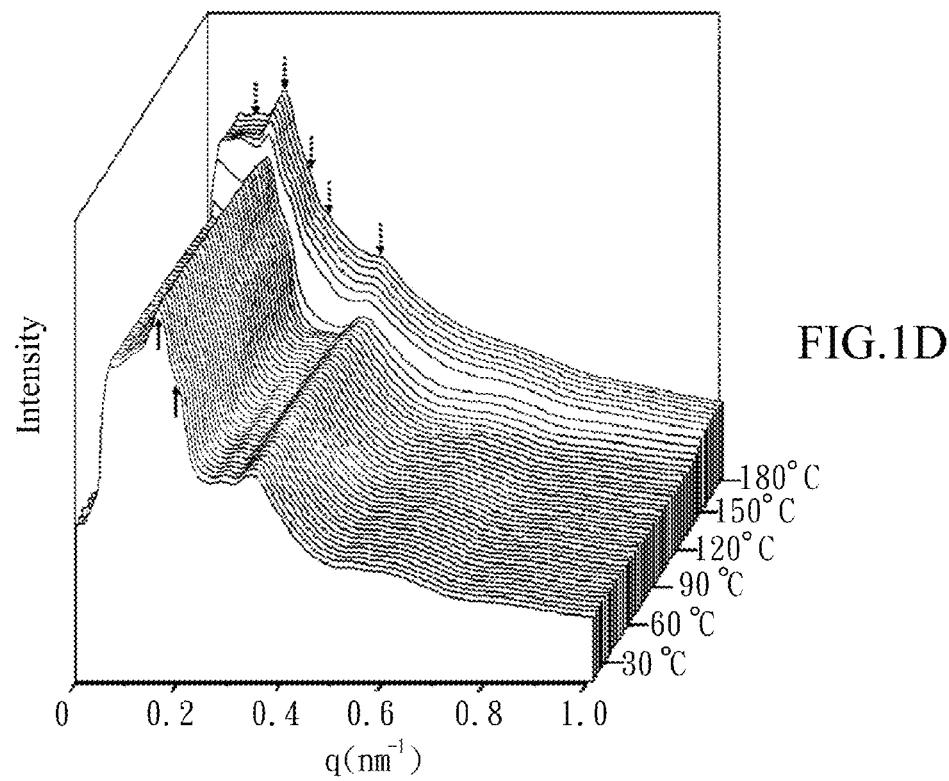
FIG. 1D shows a temperature-resolved one-dimensional small-angle X-ray scattering (SAXS) profiles of PS/SiO$_2$ double gyroid nanohybrids from 30 to 180° C. in accordance with an embodiment of the present invention.
Figure 1E:
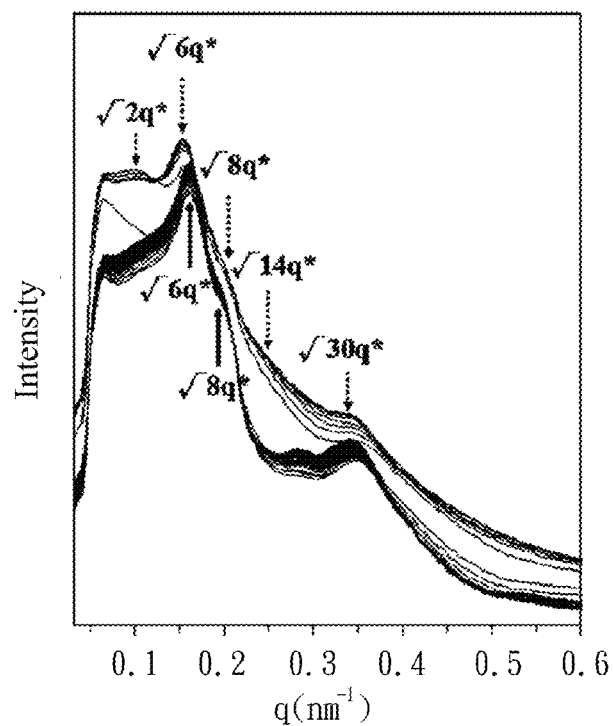
FIG. 1E shows the corresponding variation of 1D SAXS profiles of FIG. 1D.

Comparing FIG. 1A and FIG. 1B, the "double wave" pattern (FIG. 1A) of the DG structure transforms to a variety of unusual patterns such as a honeycomb-like pattern (FIG. 1B). The inventers of this invention suggest that patterns such as the honeycomb-like pattern are attributed to the shifting of two $SiO_2$ networks in the polystyrene (PS) matrix as indicated by the repositioning of the tripods marked with red (R) and green (G) colors. FIG. 1C is the corresponding transmission electron microscopy (TEM) micrograph of the <111> projection of FIG. 1B, in which the two tripods marked with red (R) and green (G) colors denotes two continuous single gyroids networks, which are penetrated but independent to each other.

Figure 2A:
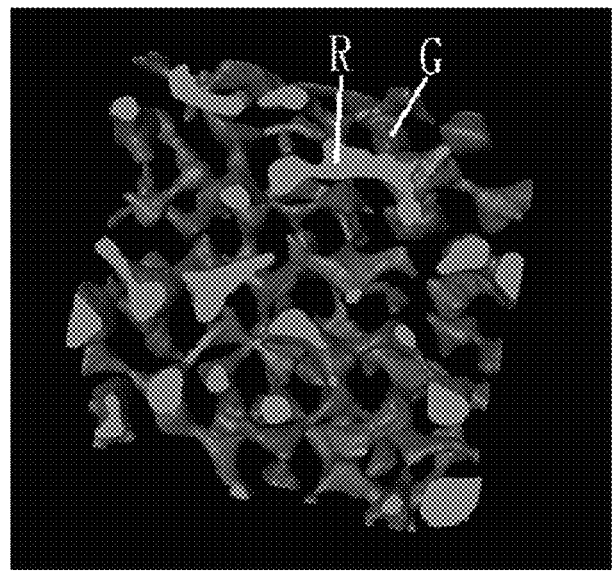
FIG. 2A is a <111> projection of a reconstructed 3D image of the double gyroid (DG) PS/SiO$_2$ structure showing a pair of continuous, interpenetrating but independent single gyroid (SG) SiO$_2$ networks (green and red) in the polystyrene (PS) matrix in accordance with an embodiment of the present invention.
Figure 2B:
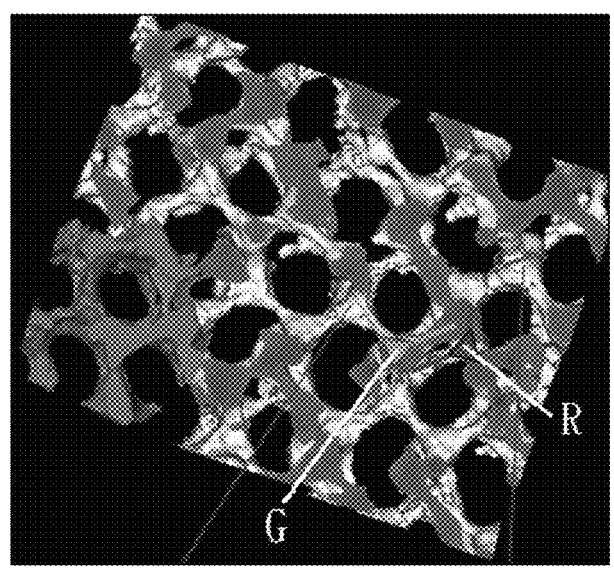
FIG. 2B is a <111> projection of a reconstructed 3D image of the two separate but shifted single gyroid (SG) SiO$_2$ networks after thermal treatment in accordance with an embodiment of the present invention.

To further understand and interpret such non-DG projections, electron tomography (3D TEM) is carried out to directly visualize the new structure in real space. FIG. 2A shows the <111> projection of the reconstructed 3D image of the double gyroid (DG) $PS/SiO_2$ structure with a pair of continuous, interpenetrating but independent single gyroid (SG) $SiO_2$ networks (green and red) in the polystyrene (PS) matrix. FIG. 2B shows the <111> projection of the reconstructed 3D image of the two separate but shifted single gyroid (SG) $SiO_2$ networks after thermal treatment. The two single gyroid (SG) $SiO_2$ networks are against each other after the thermal treatment.

Figure 2C:
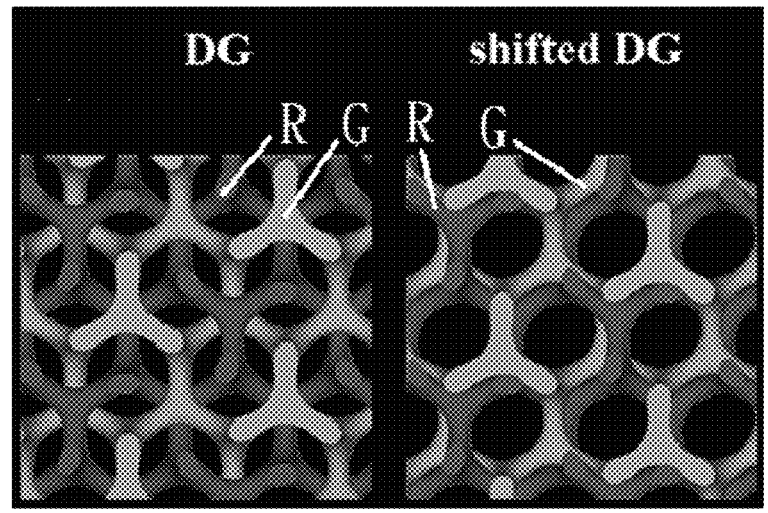
FIG. 2C shows the corresponding simulated projections of the double gyroid (DG) and the fabricated (shifted) SiO$_2$ networks.
Figure 2D:
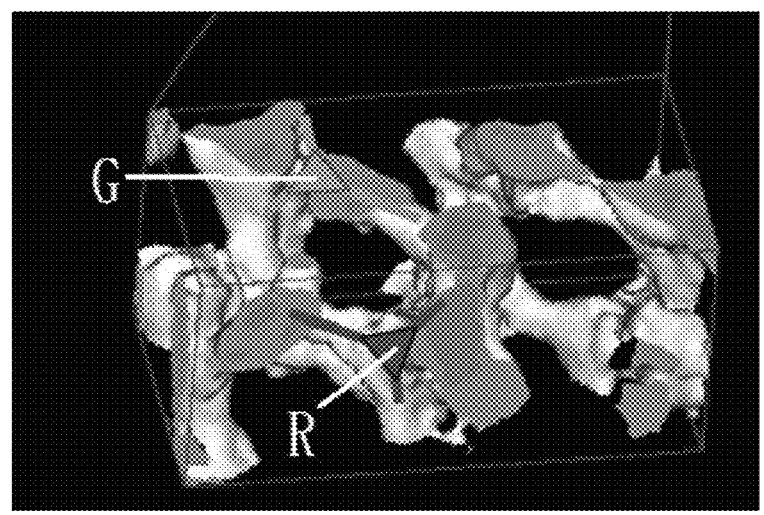
FIG. 2D is an enlarged image of the micro-domains of shifted SiO$_2$ of FIG. 2B, i.e., single gyroid-like (SG-like) SiO$_2$.

FIG. 2C shows the corresponding simulated projections of the double gyroid (DG) and the fabricated (shifted) $SiO_2$ networks. FIG. 2D is an enlarged image of the microdomains of shifted $SiO_2$, i.e., single gyroid-like (SG-like) SiO2. Two independent $SiO_2$ networks are marked with red and green skeletons constructed from trivalent connectors. In addition, selected area electron diffraction (SAED) indicates that the $SiO_2$ networks remain amorphous after the thermal treatment from 30 to 180° C. The shifting of the $SiO_2$ networks does not lead to the merging/fusing of the networks as shown in FIG. 2D as the packing of the two networks is frustrated by the clockwise and the anticlockwise twists (i.e., right-handed and left-handed networks) and the intervening polystyrene (PS) blocks.

There are many grain boundaries resulting from the intrinsic nature of bulk self-assembled $SiO_2$ networks after the thermal treatment. The grain size of the double gyroid (DG) phase is usually $10\times10\times10$ $\mu m^3$, giving more than $10^6$ grains in a sample with one $mm^3$ in size so that it is impossible for coherent network shifting (i.e., a fixed displacement along a particular direction) due to the restriction of the displacements of the networks at grain boundaries and defects, there are connections between the networks. As a result, the network morphology after the thermal treatment will exhibit a variety of geometric dispositions due to the set of small arbitrary shifts with various directions and magnitudes between two networks in a given double gyroid (DG) grain. The overall network shifting will be nearly random due to the various constraints on coherent shifting, consistent with observations of various unusual patterns from transmission electron microscopy (TEM). After the thermal treatment, the displacements between two single gyroid (SG) networks have various directions and magnitudes in a given double gyroid (DG) grain.

Network shifting will break the inversion symmetry of the DG phase, resulting in two incoherent single gyroid networks. The single gyroid network pairs will have various registrations, varying from grain to grain. The resultant overall morphology from the random shifting in the polygrain samples will therefore lead to x-ray diffraction as from a single gyroid (SG), consistent to the SAXS results at which the low q reflection can be clearly identified in different samples after the thermal treatment but with the intensity and sharpness of the low q reflection varying from sample to sample due to the variation in grain size and local defect content from self-assembly. Also, there are no reflections different to single gyroid (SG) after the thermal treatment, indicating that the set of reflections can be attributed to the set of single gyroid networks with incoherent character. In other words, the fabricated two asymmetric single gyroid networks have the same SAXS results (characteristics) as a true single gyroid network. Therefore, the fabricated two asymmetric single gyroid networks can be referred to as a "single gyroid-like" network. The displacements between two single gyroid (SG) networks have various directions and magnitudes in a given double gyroid (DG) grain causing this unique property.

It is speculated that the reflection could be more if the matrix is removed from the nanohybrids. The matrix may limit the shifting of the two single gyroid networks, and the displacements between two single gyroid (SG) networks may be more random after removing the matrix.

Figure 3A:
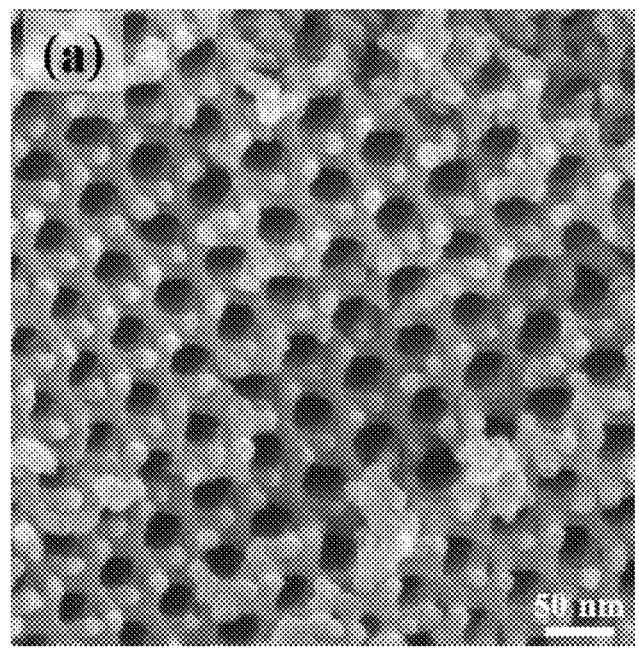
FIGS. 3A and 3B are Field-Emission Scanning Electron Microscope (FESEM) micrographs of produced nanoporous SiO$_2$ SG-like network formed from PS/SiO$_2$ DG nanohybrids after removal of PS and calcination at 550° C. and are taken along the <111> and <211> direction, respectively.
Figure 3B:
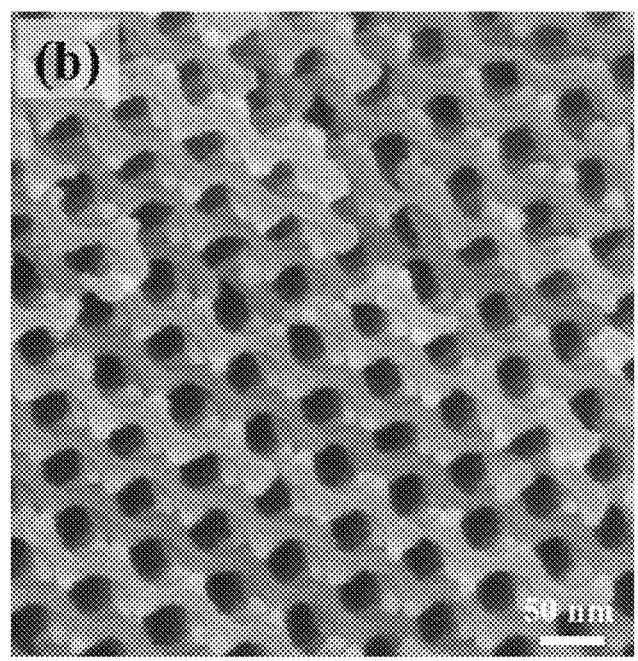

Therefore, to obtain network morphologies with SG-like properties and enhance the dielectric contrast for optical performance, a calcination process may be performed by heating the $PS/SiO_2$ nanohybrids to 550° C. for complete removal of the PS matrix, so as to release the constraints from the PS matrix and give expected random shifting. FIGS. 3A and 3B are a Field-Emission Scanning Electron Microscope (FESEM) micrographs of produced nanoporous $SiO_2$ SG-like network formed from $PS/SiO_2$ DG nanohybrids after removal of PS and calcination at 550° C. and are taken along the <111> and <211> direction, respectively.

Figure 3C:
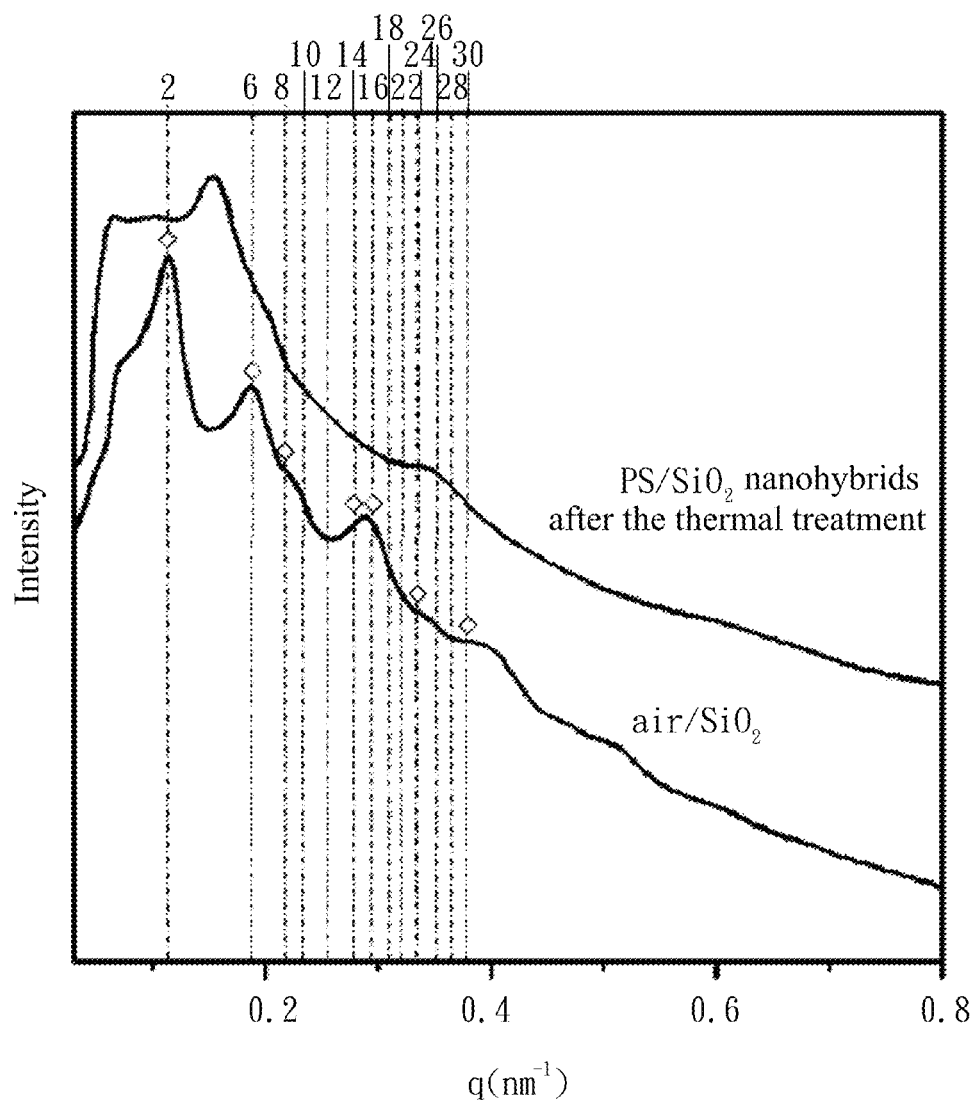
FIG. 3C shows the one-dimensional small-angle X-ray scattering (SAXS) profile of the produced SG-like air/SiO$_2$.

As shown in FIGS. 3A and 3B, the freestanding SG-like $SiO_2$ consisting of two adhered but separated SG networks can be clearly recognized. It is also noted that various network morphologies can be found in SEM images. On the basis of the SEM observations, the networks shift by various directions and magnitudes. FIG. 3C shows the one-dimensional small-angle X-ray scattering (SAXS) profile of the produced SG-like $air/SiO_2$. In contrast to the $PS/SiO_2$ nanohybrids after the thermal treatment, a significant increase in the intensity and sharpness of the $\sqrt{2}$ reflection and the appearance of additional reflections of $\sqrt{16}$ and $\sqrt{22}$ can be identified due to the more random small network shifting and the significant enhancement on electron density contrast for scattering. On the basis of the Miller indices of the single gyroid (SG) structure, the corresponding reflections of the $SiO_2$ network morphology can be indexed as 110 ($q=\sqrt{2}$), 211 ($\sqrt{6}$), 220 ($\sqrt{8}$), 321 ($\sqrt{14}$), 400 ($\sqrt{16}$), 332 ($\sqrt{22}$), 521 ($\sqrt{30}$). As a result of the shifting of the two SG networks, the inversion symmetry of DG is lost. Thus, super group to subgroup symmetry properties has been achieved due to the structural transitions from random shifting.

To examine the feasibility of exploiting the produced novel nanoporous material with SG-like properties for optical applications, the corresponding dispersion relations (band structure) w(k) were simulated using the software package Lumerical Solutions based on the finite-difference time-domain (FDTD) method. The geometry of the gyroid surface is approximated by the function:

$$\sin x \cos y + \sin y \cos z + \cos x \sin z = t$$

Because the shrinkage of the $SiO_2$ gel monoliths is between approximately 20% and 30% after removal of the remaining liquid, a volume fraction of the double gyroid (DG) skeleton is set to 30%. A double gyroid structure with a two networks each of 15% volume fraction can be made by choosing t=+/−1.055. Periodic boundary conditions are used to create a three-dimensional lattice structure, and the unit cell "a" (lattice parameter) is set to 100 nm according to the small-angle X-ray scattering (SAXS) results.

Figure 4A:
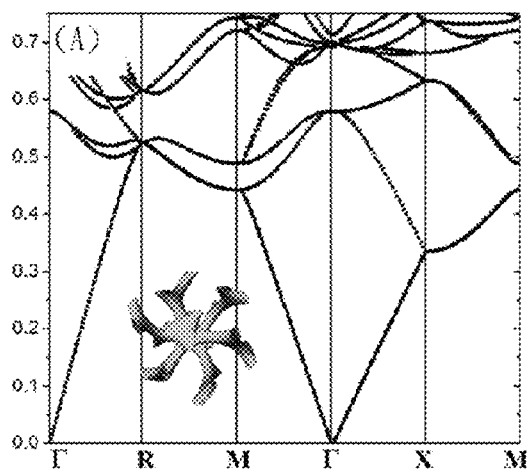
FIGS. 4A-4C respectively show the band structures of double gyroid (DG), shifted DG (produced SG-like network by an embodiment of this invention), and single gyroid (SG) nanostructure.
Figure 4B:
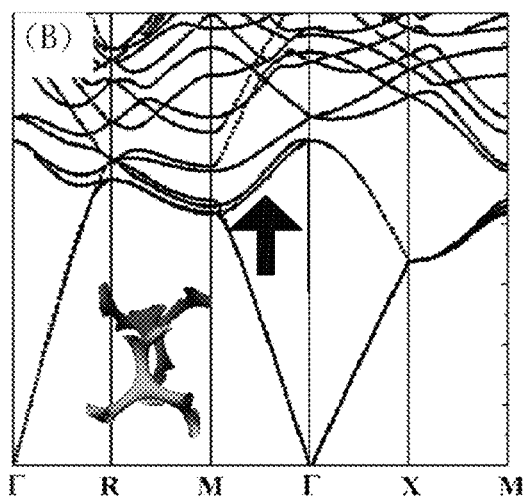
Figure 4C:
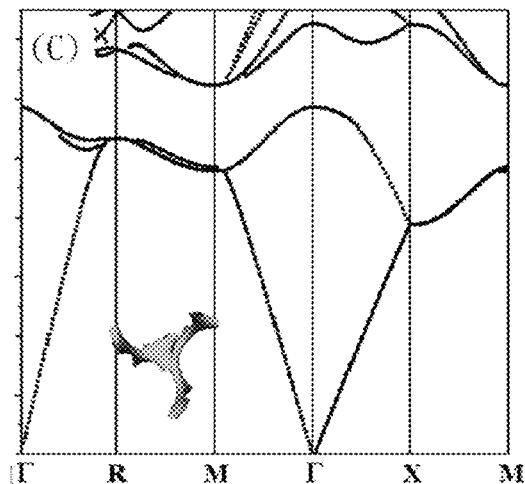

FIGS. 4A-4C respectively show the band structures of double gyroid (DG), shifted DG (produced SG-like network), and single gyroid (SG) nanostructure with unit cell of 100 nm and volume fraction of 30%, 30%, and 15%. The refractive index of gyroid skeleton is 2.5 with the $air/TiO_2$ dielectric contrast of 6.25:1. Note that the proposed nanoporous $TiO_2$ can also be fabricated by the templated sol-gel reaction as recited in the above-mentioned embodiment of the present invention.

As shown in FIG. 4A, For the DG, no complete photonic bandgap (PBG) is observed for the double gyroid. As shown in FIG. 4B, a partial photonic bandgap (PBG) as indicated with an arrow opens between the $3^{rd}$ and $4^{th}$ bands at the gamma point for the perturbed DG morphology resulting from a network shift of 42 nm along the <110> direction, reflecting the effect of a specific displacement on the band diagram. With random shifting to give a resultant network material with SG-like scattering results, it is reasonable to expect a single gyroid (SG) photonic bandgap (PBG) based on the structural character for optical properties. As shown in FIG. 4C, a complete gap can be found for a single gyroid (SG) in the range of $0.585 \ c/a < \omega/2\pi < 0.623 \ c/a$, corresponding to the ultraviolet region, where c is speed of light and a is lattice parameter determined as 100 nm. Accordingly, one can expect that a structure composed of randomly shifted G networks would exhibit unique nanophotonic behavior.

It is appreciated that the novel asymmetric single gyroid-like network texture, is unwittingly found by the inventers. The inventers discover the asymmetric single gyroid-like network texture has unique properties, and then think the rationale for the unique properties and the principle to fabricate the novel network texture.

In this embodiment, a double gyroid form of block copolymer with a segment capable of being removed, such as polystyrene and poly-L-lactide block copolymer (PS-PLLA BCP), is selected to use as a matrix. After the poly-L-lactide block is hydrolyzed, a double gyroid form of polystyrene matrix is formed. The polystyrene matrix is then used as a matrix and a nanoreactor, and a sol-gel reaction in introduced within the porous structure of the matrix, so as to produce a double gyroid form of $PS/SiO_2$ nanohybrids. After that, the $PS/SiO_2$ nanohybrids is annealed to soften the polystyrene matrix, resulting in a network shifting of the two independent and interpenetrating single gyroid $SiO_2$ network structures. The two independent, interpenetrating single gyroid $SiO_2$ network structures gradually approach and contact each other, so as to form a robust single gyroid-like network structure. Note that both the two independent, interpenetrating single gyroid network structures are composed of $SiO_2$, and the thermal treatment to the $PS/SiO_2$ will not soften or damage the $SiO_2$. Therefore, the thermal treatment of the two single gyroid $SiO_2$ network structures render the network shifting rather than collapse.

The same principle as mentioned in above embodiment can be used to develop other bi-continuous network structures, e.g., double diamond or plumber's nightmare structure.

Figure 5A:
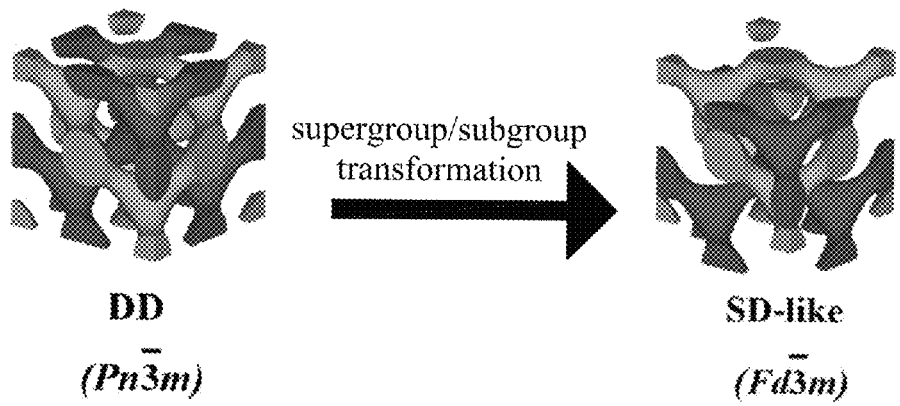
FIG. 5A shows that a novel network texture is made by shifting two symmetric diamonds of a double diamond (DD, Pn3̄m) to two asymmetric diamonds (a single diamond-like network texture) according to an embodiment of this invention.

As shown in FIG. 5A, one embodiment of the present invention employs the above-mentioned principle to produce a novel network texture by shifting two symmetric diamonds of a double diamond (DD, Pn3̄m) to two asymmetric diamonds, i.e., a single diamond-like network texture.

Figure 5B:
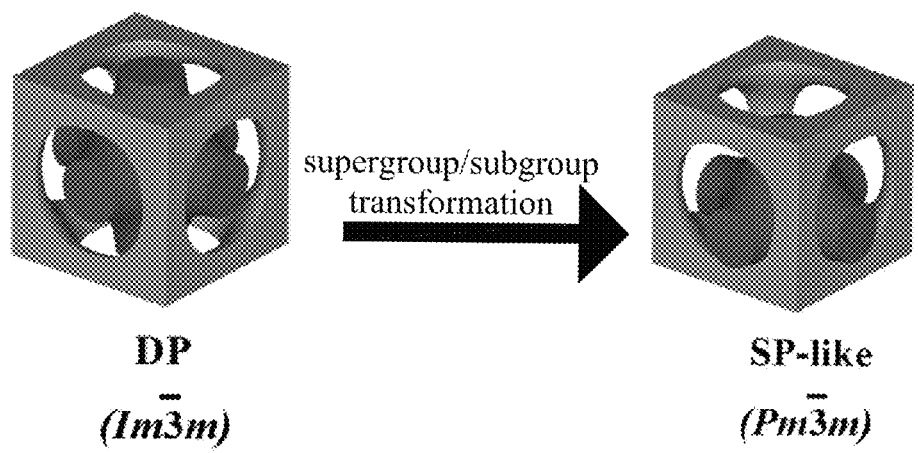
FIG. 5B shows that a novel network texture is made by shifting the two continuous phases of a plumber's nightmare structure (double P (DP), Im3̄m) into two asymmetric continuous phases (a single plumber-like network texture) according to an embodiment of this invention.

As shown in FIG. 5B, one embodiment of the present invention employs the above-mentioned principle to produce a novel network texture by shifting the two continuous phases of a plumber's nightmare structure (double P (DP), Im3̄m) to two asymmetric continuous phases, i.e., a single plumber-like network texture.

In the above embodiments, a simple method is provided for the preparation of new material systems by random network shifting from materials with high symmetry (e.g., supergroup symmetry) to lower symmetry (e.g., subgroup symmetry). For example, breaking of the inversion symmetry of a double gyroid structure comprised of polymer/ceramic nanohybrids is used as a model system for the demonstration of how shifting networks can achieve subgroup symmetry properties (i.e., SG-like properties) from the materials with supergroup symmetry (i.e., DG) properties. The new three-dimensional network morphology may give desirable nanophotonic properties similar to those of the butterfly wing structure. The mechanism of network shifting can be applied in other registered bi-continuous cubic networks through the supergroup/subgroup transformation. For example, from coherent network structures to incoherent networks such as double diamond (DD, Pn3̄m) to single diamond-like (SD-like, Fd3̄m) and from double P (DP, Im3̄m) to single P-like (SP-like, Pm3̄m) as shown in FIGS. 5A and 5B. It is noted that various well-defined polymer-based nanohybrids can be synthesized via a variety of templated approaches. As a result, the present invention develops a platform technology to fabricate novel network textures having adjustable chemical composition and novel properties from bi-continuous cubic structures.

Although specific embodiments have been illustrated and described, it will be appreciated by those skilled in the art that various modifications may be made without departing from the scope of the present invention, which is intended to be limited solely by the appended claims.

What is claimed is:

1. A network texture comprising two incoherent continuous network structures;
    wherein the two incoherent continuous network structures are formed by the steps of:
    forming a porous structure as a matrix;
    forming two coherent, independent, and separated robust continuous network structures within the matrix by using the matrix as the template; and
    softening or removing the matrix to shift the two coherent continuous network structures, leading to a novel network texture comprising the two incoherent continuous network structures;
    wherein a small-angle X-ray scattering (SAXS) analysis is performed to the two incoherent continuous network structures, and only one of the two incoherent continuous network structures is identified by the small-angle X-ray scattering analysis.

2. The network texture as set forth in claim 1, wherein the two incoherent continuous network structures are two single gyroid network structures.

3. The network texture as set forth in claim 1, wherein the two incoherent continuous network structures are two single diamond network structures.

4. The network texture as set forth in claim 1, wherein the two incoherent continuous network structures construct a single plumber-like network texture.

* * * * *